(12) United States Patent
Trim et al.

(10) Patent No.: US 11,375,023 B2
(45) Date of Patent: Jun. 28, 2022

(54) DYNAMICALLY CONFIGURING A WEB SERVER TIMEOUT

(71) Applicant: International Business Machines Corporation, Armonk, NY (US)

(72) Inventors: Craig M. Trim, Ventura, CA (US); Shikhar Kwatra, Durham, NC (US); Vinod A. Valecha, Maharashtra (IN); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/700,478

(22) Filed: Dec. 2, 2019

(65) Prior Publication Data

US 2021/0168211 A1 Jun. 3, 2021

(51) Int. Cl.
*H04L 67/14* (2022.01)
*H04L 67/02* (2022.01)
*H04L 43/062* (2022.01)
*H04L 69/28* (2022.01)
*H04L 67/50* (2022.01)

(52) U.S. Cl.
CPC ............ *H04L 67/14* (2013.01); *H04L 43/062* (2013.01); *H04L 67/02* (2013.01); *H04L 67/22* (2013.01); *H04L 69/28* (2013.01)

(58) Field of Classification Search
None
See application file for complete search history.

(56) References Cited

U.S. PATENT DOCUMENTS 7,953,870 B1 5/2011 Reeves et al.
9,763,097 B2 * 9/2017 Robinson .............. H04W 12/08
(Continued)

FOREIGN PATENT DOCUMENTS

WO 2005065261 A2 7/2005

OTHER PUBLICATIONS

West Wind Connection, Configuring Execution Timeout for Server Requests, Mar. 26, 2018, https://webconnection.west-wind.com/docs/_54u0q5s21.htm.
(Continued)

*Primary Examiner* — Davoud A Zand
(74) *Attorney, Agent, or Firm* — Garg Law Firm, PLLC; Rakesh Garg; Rakesh Roy

(57) ABSTRACT

A method, system and computer program product for dynamically adjusting a timeout parameter associated with a connection between a client device and a server. Information is associated with at least one of a characteristic of a content to be rendered by a server, a characteristic of traffic of a connection to the server, and a characteristic of a user of the server is received from the client device and transmitted to the server. Based on the transmitted information, an amount of time in a previously stored timeout parameter associated with a client device is adjusted automatically with a new timeout parameter to enable communication between the client device and the server. The new timeout parameter is stored in place of the previously stored timeout parameter. Responsive to the amount of time to wait for a response from the client device satisfying the new timeout parameter, the communication between the client device and the server is terminated.

20 Claims, 6 Drawing Sheets

(56) References Cited

U.S. PATENT DOCUMENTS

| | | | |
|---|---|---|---|
| 11,051,350 B2* | 6/2021 | Barkan | H04W 76/14 |
| 2005/0198190 A1* | 9/2005 | Zavalkovsky | H04L 67/00 |
| | | | 709/217 |
| 2006/0212350 A1* | 9/2006 | Ellis | G06Q 30/0269 |
| | | | 705/14.41 |
| 2006/0291455 A1* | 12/2006 | Katz | H04W 12/068 |
| | | | 370/355 |
| 2008/0120129 A1* | 5/2008 | Seubert | G06Q 40/125 |
| | | | 705/305 |
| 2011/0106940 A1 | 5/2011 | Chauvin et al. | |
| 2013/0316687 A1* | 11/2013 | Subbaramoo | G06F 1/3246 |
| | | | 455/418 |
| 2015/0281272 A1 | 10/2015 | Iyengar et al. | |
| 2019/0050044 A1 | 2/2019 | Amsterdam et al. | |
| 2019/0099653 A1* | 4/2019 | Wanke | A63B 24/0062 |
| 2020/0394524 A1* | 12/2020 | Vainsencher | G06N 3/084 |

OTHER PUBLICATIONS

Fiu.edu, Timeout and Keep Alive Directives, 2019, http://users.cis.fiu.edu/~downeyt/cgs4854/timeout.

Ip.com, A Method to Add Dynamic Loading Bar in Existing Applications, Jul. 14, 2011, https://priorart.ip.com/IPCOM/000208648.

* cited by examiner

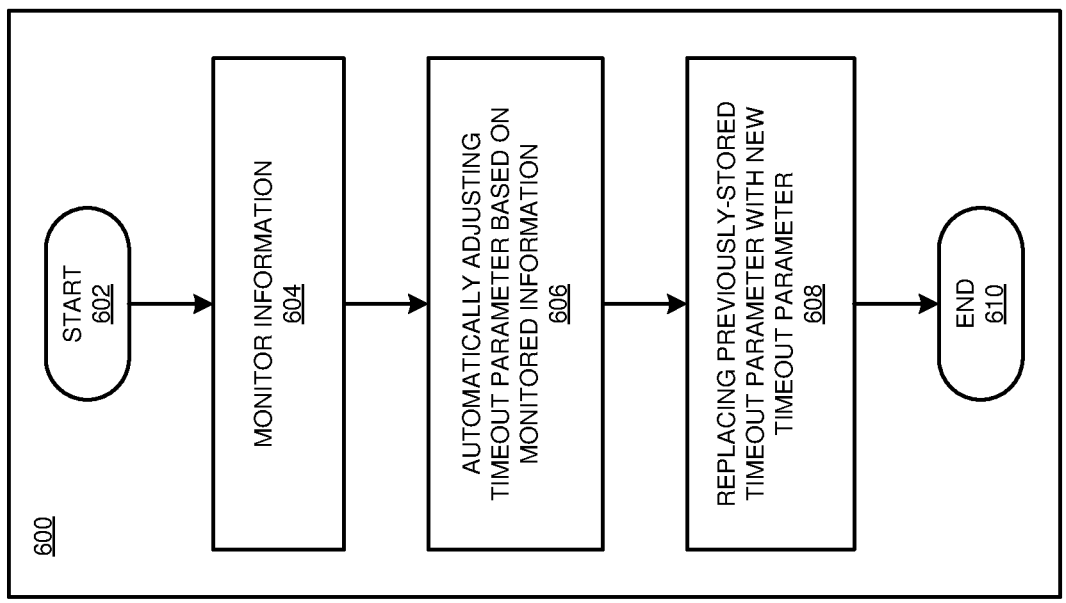

US 11,375,023 B2

DYNAMICALLY CONFIGURING A WEB SERVER TIMEOUT

TECHNICAL FIELD

The present invention relates generally to a method, system, and computer program product for webserver management. More particularly, the present invention relates to a method, system, and computer program product for dynamically configuring a timeout value for a connection between a client application and a web server.

BACKGROUND

Hypertext Transfer Protocol (HTTP) communications between client applications in client devices and server computers include time limits for the client applications in the client devices to respond or provide data. When the devices do not respond with the designated time limits, a connection timeout occurs, which results in the connected server deciding to close or reset the connection with the unresponsive or inactive client device or user. Disconnecting a server's connection with an unresponsive client device or user reduces the amount of memory resources that are consumed by idle connections. Such a connection timeout protocol also ensures that idle connections are closed even if the HTTP protocol fails to close the idle connection.

Servers have a pre-configured, static connection timeout setting for any HTTP communication with any device. The web server administrator sets the timeout value as per a requirement of the client application. There are instances when the timeout value must subsequently change from its original timeout value per application requirements, causing the web server administrator to have to manually change the timeout value and to force the restart of the client application, producing additional connection downtime.

SUMMARY

Embodiments of the invention are defined by the claims below, not this summary. A high-level overview is provided here to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

The illustrative embodiments provide a method, system, and computer program product. An embodiment includes a method that receives at a server system information including at least one of a characteristic of a content to be rendered by a server, a characteristic of traffic of a connection to the server, and a characteristic of a client user of the server. An embodiment adjusts automatically, using a machine-learning heuristic model based on the received information, an amount of time in a previously stored timeout parameter associated with a client device with a new timeout parameter to enable communication between the client device and the server. An embodiment stores in a memory the new timeout parameter in place of the previously stored timeout parameter. An embodiment terminates the communication between the client device and the server if the amount of time to wait for a response from the client device satisfies the new timeout parameter.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of a process for dynamically configuring a connection timeout value for a client device with a server, in accordance with an illustrative embodiment.

DETAILED DESCRIPTION

Figure 1:
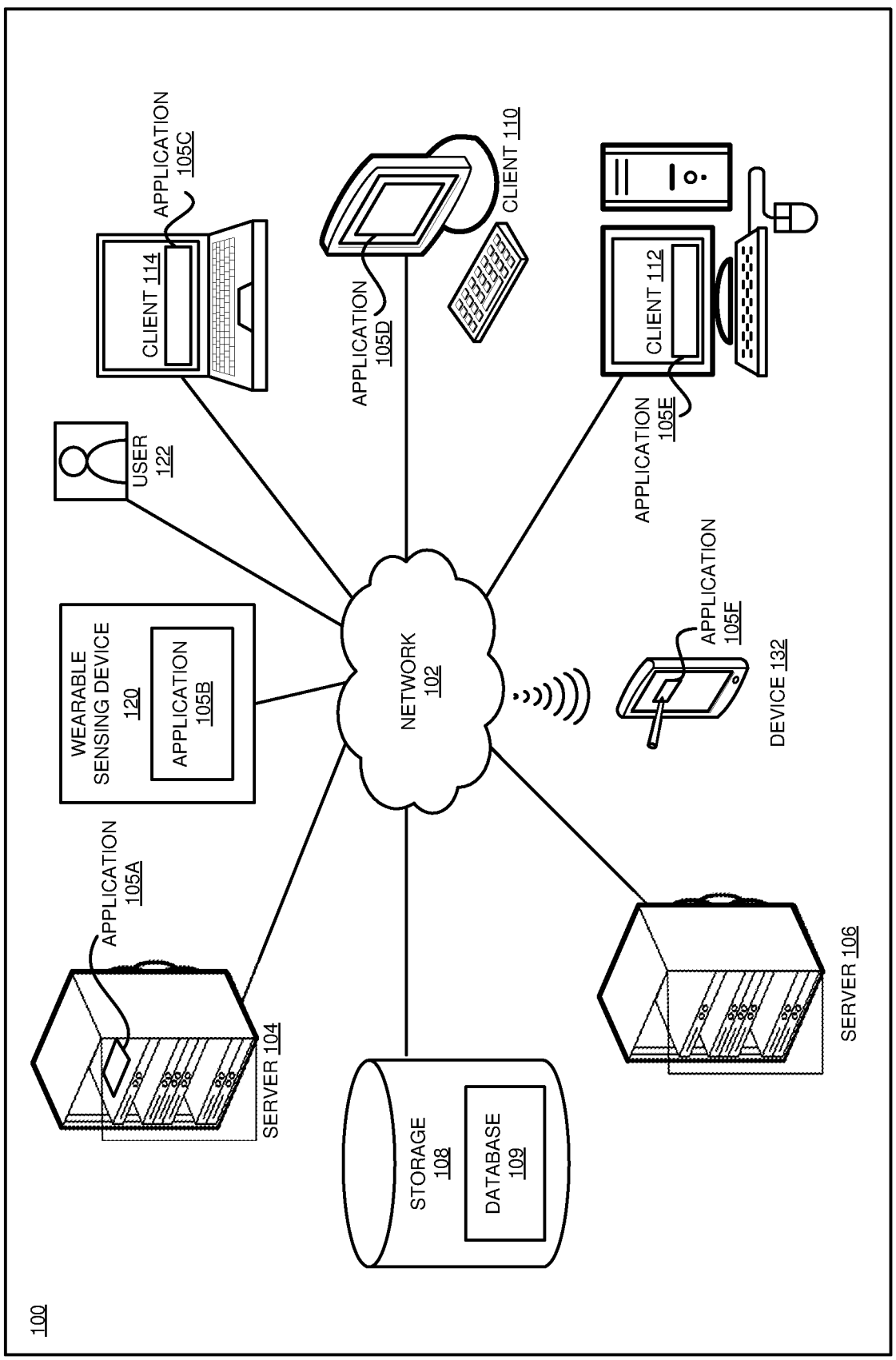
FIG. 1 depicts a block diagram of a network of data processing systems in which illustrative embodiments may be implemented.

The illustrative embodiments recognize that there is a need to reduce the amount of memory resources that are consumed by idle connections between a client device and a server. Currently, timeout values to respond to idle connections are static in nature and require an administrator to manually set the timeout value per an application's requirement. Moreover, manually setting the timeout parameter also entails the restarting of the application, which leads to temporary downtimes in access to the application/resource. Such static approach to timeout management consumes time, effort and resources that would otherwise be allocated to active users. Moreover, such a rigid application of static timeout values unnecessarily burden some active users who require additional connection time, but are disconnected before the users are able to complete their transactions or access to the web server's data.

In addition, static timeout values lack sufficient granularity to efficiently predict the appropriate timeout value under changing circumstances affecting each individual client-server connection. Such changing circumstances includes changes in a client/user's behavior, changes in traffic load/congestion, and changes in the type of content a server provides to a client device requesting the content.

The illustrative embodiments recognize that the presently available solutions do not address these needs or provide adequate solutions for these needs. The illustrative embodiments used to describe the invention generally address and solve the above-described problems and other problems related to reducing overhead costs of manually overriding static timeout settings, as well as the wasted resources due to the misallocation of longer-than-needed timeout periods for idle communications and misallocation of shorter-than-needed timeout periods for communications that require more connection time.

An embodiment can be implemented as a software application. The application implementing an embodiment can be configured as a modification of an existing connection timeout management system, as a separate application that operates in conjunction with an existing connection timeout management system, a standalone application, or some combination thereof.

Particularly, some illustrative embodiments provide a method that dynamically adjusts timeout parameters based on various characteristics of the client user's behavior as relating to the client application's connection to a service, content provider or server, or relating to the traffic load information, or the content being provided to a client or requestor, or some combination thereof. Moreover, the automatic adjustment of the timeout parameter is based on any combination of characteristic data that is being monitored during the connection between the client and the server. Responsive to a predicted timeout value for an idle connection, the new timeout value automatically replaces the previously stored timeout value with respect to the particular device-server connection.

Different characteristic data is collected using data sensors that are located at various points in the network connection between. For example, characteristic data relating to the type of content being rendered by the server is captured by a sensor at the content server.

In another example, characteristic data relating to a client user's behavior is captured by a sensor at the client device. Such sensors include but are not limited to: pressure sensors to detect keyboard presses, mouse presses, touch presses (as in the case of touchscreen technologies), gaze detection sensors with the assistance of a camera that detects changes in a user's eye activity, object distance sensors with the assistance of a camera that detects changes in the distance of a user from the client device, sensors on Internet of Things (IoT) devices that detect presence or user activity located away from the client device and report the activity to a timeout manager connected to the IoT device and the client device. Other types of user behavioral data include but are not limited to handwriting, voice signature, breathing rate changes, changes in the voice tone or audible patterns that can indicate anxiety, anger, excitement, distress, rigorous physical activities, startle, fear, or mental unrest. Other sensor examples relating to a client user relates to the collection of physiological biometric data of the user. A physiological biometric data may be data related to an event that tests, reads, or captures a physical aspect of the body such as facial features, fingerprints, handshape, iris blood vessel patters (iris scan), DNA sequences, pulse rate, pulse pressure, and muscle tension. Such sensors are part of a client device, such as a laptop computer, smartphone, or wearable sensing device.

In another example, characteristic data relating to the client application's connection to a service provider or content provider include a sensor(s) at a gateway server connected to the client device. The sensor(s) detect location data of a requesting client application. Other sensors at a gateway server collect traffic congestion data, measuring the amount of requesting client applications attempting connections with a content server.

With respect to the timing in collecting the different characteristic data, the sensor's collection of location and traffic data occurs periodically or in real-time. Collection timing can vary between different client devices and content servers. The various sensors collect the characteristic data and transmit the data to a dynamic timeout management server.

The dynamic timeout management server processes the received characteristic data and routes the particular collected characteristic data to one of three analysis modules: a user behavior analysis module, a traffic load analysis module, and a content provider analysis module, as applicable. At each analysis module, the received data will undergo an analysis, comparing the received characteristic data to historical pattern data relating to the received characteristic of interest.

Once the initial processing of the received data and its comparison to historical data is performed, the processed data from one or more of the analysis modules is sent to a timeout controller module where a predetermined heuristics model is applied to the processed data and further processes the compared data and makes predictions relating to a connection timeout parameter value. In this regard, the heuristics model is machine-learning model that seeks to optimize the timeout parameter in view of the current connection environment and desired timeout outcomes.

In view of the foregoing embodiments, the ability to automatically increase or decrease a timeout parameter value when factoring changing user behavior(s), changing connection traffic patterns, and changing types of content to be provided via the connection allows for a fine-grained approach to timeout management. The examples described herein of dynamically adjusting timeout parameters are not meant to be limiting in any way. From this disclosure, those of ordinary skill in the art will be able to conceive many other ways of implementing a dynamic adjustment of timeout values and the same are contemplated within the scope of the illustrative embodiments.

The manner of dynamically adjusting a connection timeout parameter as described herein is unavailable in the presently available methods in the technological field of endeavor pertaining to timeout parameter management. A method of an embodiment described herein, when implemented to execute on a device or data processing system, comprises substantial advancement of the functionality of that device or data processing system by factoring characteristics of the user's behavior, the traffic load congestion levels, and the content types provided.

The illustrative embodiments are described with respect to certain types of computer memories, storage devices, gateway servers, timeout management systems, cloud computing systems, virtual computing systems, operating systems, computing systems, server systems, data processing systems, networked computing environments, devices, other environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data instruction, data source, instruction source, access to a data source over a data network, or access to an instruction source over a data network. Any type of storage device may provide the data or instruction to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable computing devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
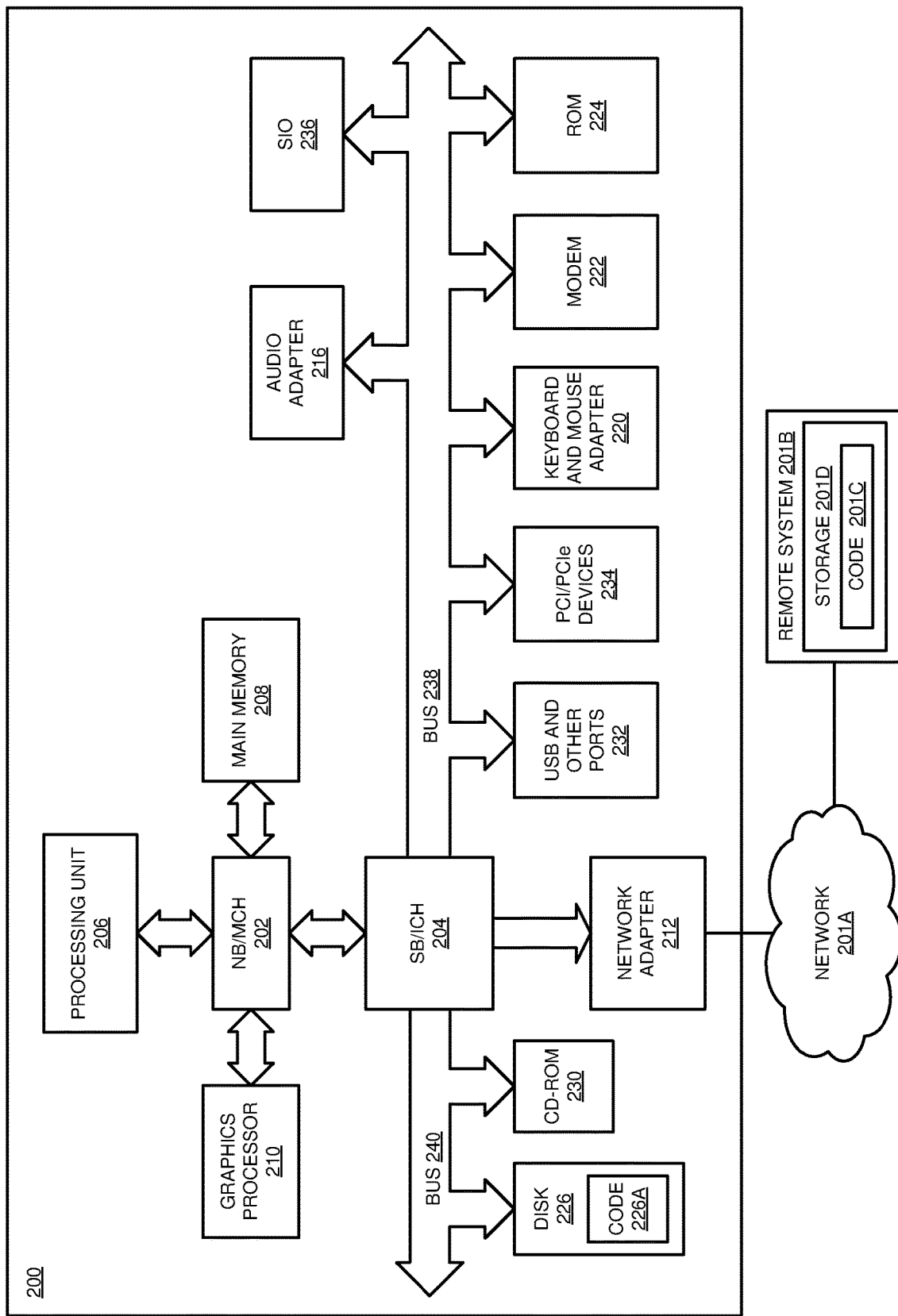
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

A wearable sensing device 120 includes one or more pressure sensors configured to be disposed upon one or more body parts of user 122 for detecting pressure changes within the body part. In one or more embodiments, the wearable sensing device 120 further includes one or more accelerometers for sensing motion of the body part.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment is distributed across several data processing systems and a data network as shown, whereas another embodiment is implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 on a server-side implements an embodiment described herein. In other embodiments described herein, the application 105 is implemented on a client-side (e.g., in wearable sensing device 120, clients 110-114, and device 132). According to one embodiment, the application 105 collects, using sensor devices (not shown), biometric characteristics and transmits the biometric characteristics to another application on the server-side, where the biometric characteristics are used to calculate a timeout value to replace a previously-stored timeout value. According to some embodiments, the exchange of biometric and sensitive data between an application on the user's device on the client-side and a timeout management application on the server-side of the network requires a secure handshaking exchange of permissions and authenticating data. A database 109 may be stored in storage 108 as shown or supplied by another source (not shown). Application 105 can also execute in any of data processing systems 104, 106, 110, 112, and 114. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the content or service.

With reference to FIG. 2, this figure depicts a block diagram of a data processing system 200 in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as client-side application 105*b-f* or server-side application 105*a* in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
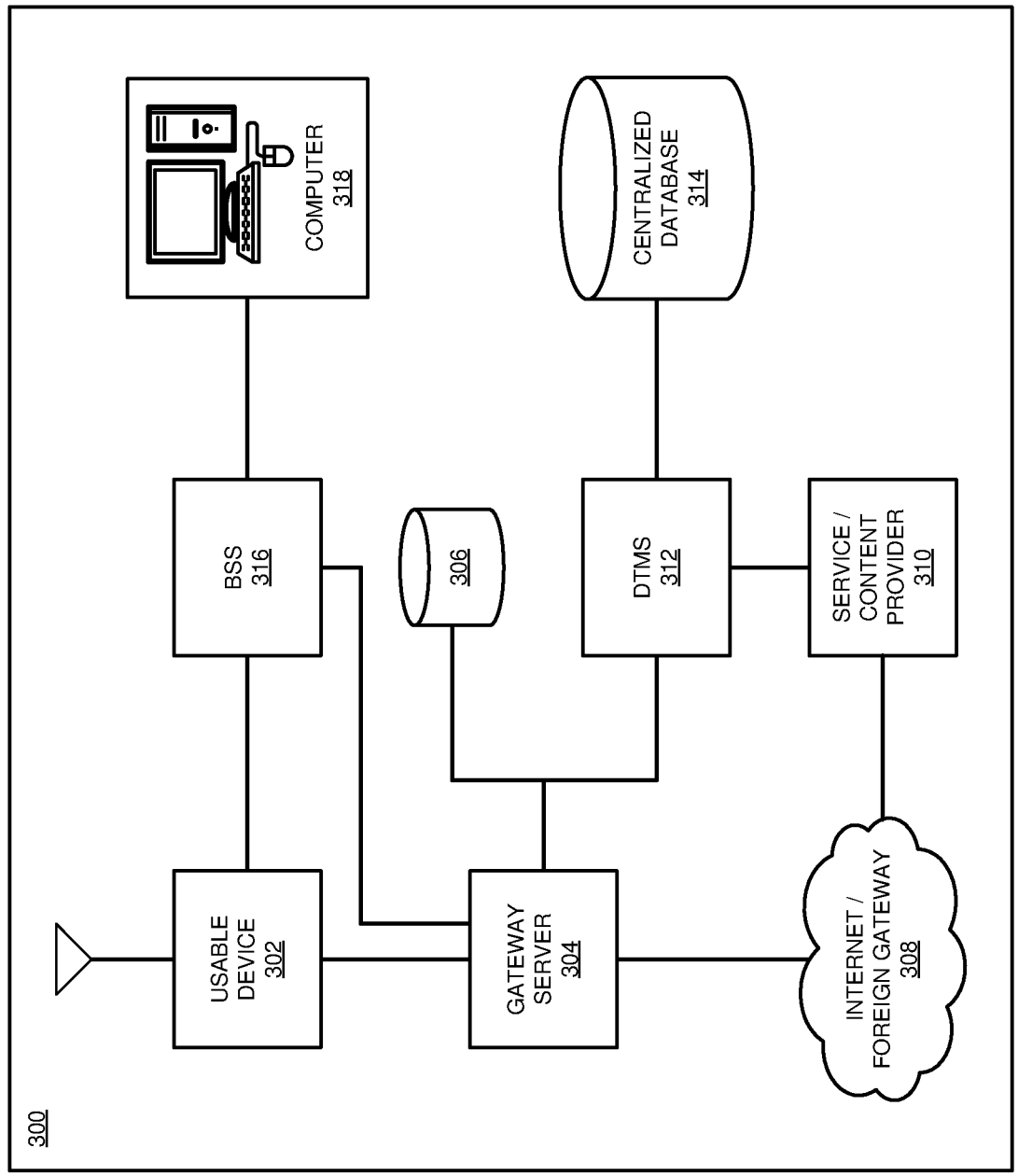
FIG. 3 depicts a block diagram of a network for dynamically adjusting connection timeout values of devices in which illustrative embodiments may be implemented.

With reference to FIG. 3, an example of a network 300 for dynamically adjusting a connection timeout value is shown with mobile device 302, gateway server 304, timeout database 306, Internet 308, a service or content provider 310, a dynamic timeout management system (DTMS) 312, a centralized timeout database 314, business supporting systems (BSS) 316, and a computer 318. Network 300 provides components to dynamically adjust connection timeout values for a client device, namely mobile device 302.

Continuing with FIG. 3, mobile device 302 includes a number of applications (not shown) located on mobile device 302. Mobile device 302 attempts to access web service or web content from content provider 310. Mobile device 302 connects to gateway server 304, which connects through the Internet 308 to content provider 310. Gateway server 304 keeps track of the amount of time for mobile device 302 and content provider 310 to respond to each other. The amount(s) of time expected for mobile device 302 and content provider 310 to respond are kept in respective time parameters which are stored in locally managed or regionally managed timeout database 306 connected to gateway server 304.

If an application of mobile device 302 or content provider 310 exceeds its timeout parameter by not responding in the appropriate time, the timeout parameter can be dynamically changed by the DTMS 312. DTMS 312 connects to gateway server 304. In some embodiments, DTMS 312 is located a standalone computer connected to the content server and gateway server 304. In other embodiments, DTMS 312 is located within gateway server 304, content provider 310, or some distributed combination thereof. The DTMS 312 monitors the responses transmitted through gateway server 304. Over time, DTMS 312 can establish or, in some embodiments, predict a behavior or baseline for the value of timeout parameters for an application of mobile device 302 or content provider 310. If the response time is exceeded over a period of time, DTMS 312 can modify the amount of time for a client application or web server application to respond and modify the timeout parameter of the client application or web server application to a new value.

The DTMS 312 works to increase and decrease timeout values in timeout parameters by monitoring the behavior of devices such as mobile device 302, content provider 310, or a combination thereof. For example, mobile device 302 may send a request for web content from content provider 310. Content provider 310 may respond in a faster time than normal. Upon monitoring this behavior through gateway server 304, DTMS 312 may decrease the amount of time in the timeout parameter for content provider 310. On the contrary, congestion may exist in the network causing content provider 310 to take more time than normal to respond to mobile device 302. As a result, timeouts for content provider 310 may occur more frequently causing gateway server 304 to cut off communications with content provider 310 when the timeout parameter is reached. As DTMS 312 monitors the situation, DTMS 312 may increase the amount of time that gateway server 304 waits for content provider 310 to respond. In a similar example from the mobile device 302 end, traffic congestion may also exist in the network causing the user of a mobile device 302 to take more time than normal to respond to content provider 310. As a result, timeouts for mobile device 302 may occur more frequently causing gateway server 304 to cut off communications with mobile device 302 when the timeout parameter is reached. As DTMS 312 monitors the situation, DTMS 312 may increase or decrease the amount of time that gateway server 304 waits for mobile device 302 to respond. For both examples, this new timeout parameter is stored in centralized timeout database 314. Additionally, or alternatively, this new timeout parameter can be locally stored in timeout database 306 supporting gateway server 304. Centralized timeout database 314 is a global database for all information while timeout database 306 is a locally-managed or regionally-managed database.

The efforts of DTMS 312 to dynamically change timeout parameters ensure an efficient and secure operation of devices in their communications with each other. The reasons for increasing or decreasing a connection timeout parameter will vary depending upon the goals and circumstances. Further description and discussion of the various factors that can influence the automatic or dynamic modification of connection timeout parameters will be discussed within the context of DTMS 312 and its component modules (see FIG. 4 below). Timeouts of devices are reduced over time since DTMS 312 monitors the historical data pertaining to retry attempts as the timeout that occurs. Other historical data factored by DTMS 312 include, but are not limited to, client user behavior patterns, traffic patterns, and calendar events. Regular maintenance or servicing of DTMS 312 may occur through BSS 316. DTMS 312 has a connection to BSS 316 for various business services that may require access to DTMS 312. BSS 316 can be manipulated or accessed by a user operating computer 318.

Figure 4:
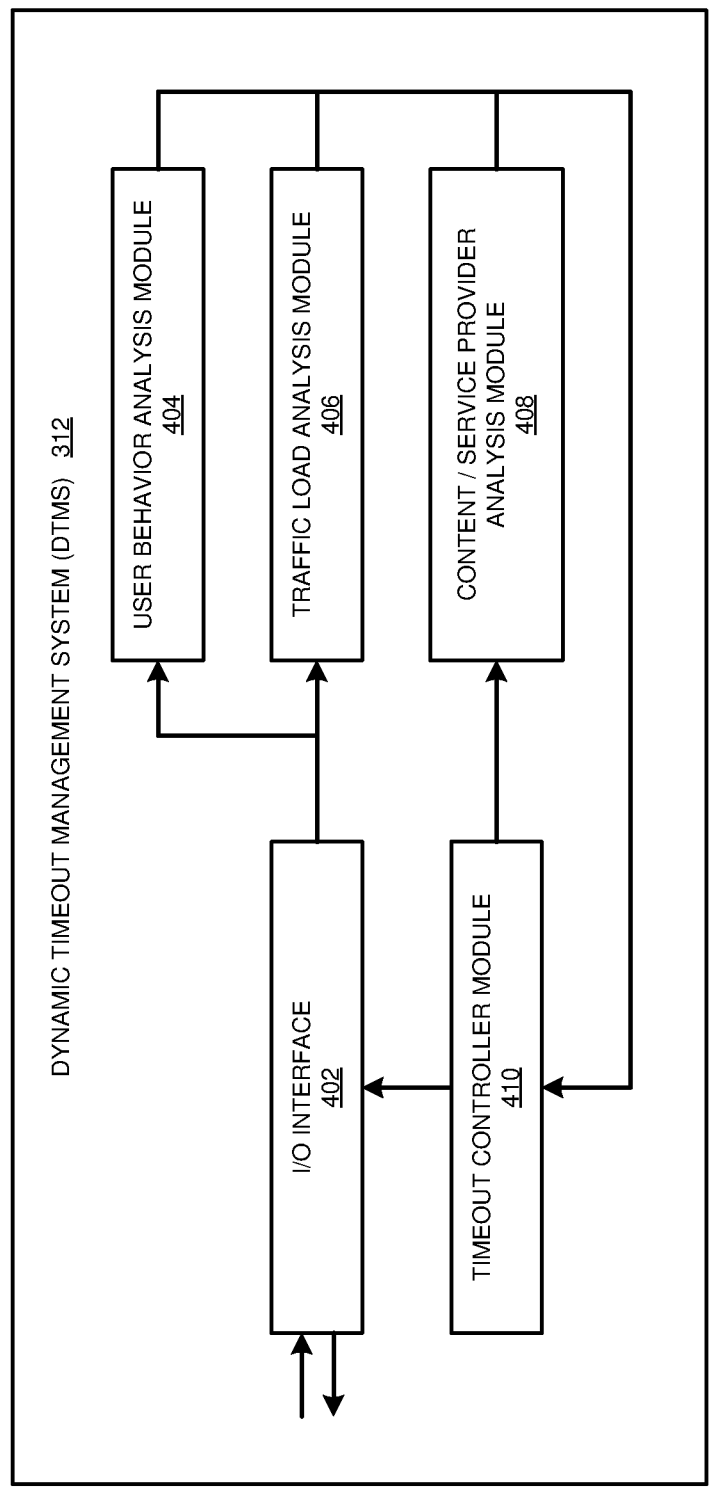
FIG. 4 depicts a block diagram showing further details of the Dynamic Timeout Management System (DTMS) of FIG. 3, in accordance with an illustrative embodiment.

With reference to FIG. 4, a diagram of DTMS 312 is shown. DTMS 312 includes an input/output (I/O) interface 402, a user behavior analysis module 404, a traffic load analysis module 406, a content provider analysis module 408, and a timeout controller module 410. In determining the suitable timeout parameter for an individual client device or a group of client devices 302, DTMS 312 receives information via I/O interface 402 from various sources that DTMS 312 weighs individually or in combination. For instance, DTMS 312 receives information from gateway server 304, which monitors not only connection times between a mobile device 302 and content provider 310, but also monitors client user behavior characteristics, and traffic load characteristics between the one or more mobile devices 302 and the content provider 310. In addition, DTMS 312 receives information from content provider 310 regarding the type of content data provided to a client user requesting the content.

The information received at I/O interface 402 is routed as appropriate to user behavior (UB) analysis module 404, traffic load analysis module 406, or content provider analysis module 408. UB analysis module 404 identifies and analyzes UB characteristics of a user of a client device, such as mobile device 302. In this regard, it should be appreciated that UB analysis module 404 can identify and analyze behavioral characteristics of a plurality of client users requesting content from a common content provider 310, or even from respectively different content providers. UB characteristics vary. An example of a UB characteristic relates to input device activity, which can include a user's keyboard or mouse activity, user monitor gaze activity, a physical distance of a user relative to its client device, age of the user, demographics of the user, and events of user interest (e.g., holidays, celebrations, weather-influenced events, any event of significance to the user of a client device). For example, UB analysis module 404 predicts connection timeout values when the number of users connected to an application increases, such as in the case of client device connections to an e-commerce website during a festival sale event. Under such a timeframe, UB analysis module predicts that a longer connection timeout parameter is required for the client devices that are connected or soon to be connected to the content provider (e.g., web server).

Traffic load (TL) analysis module 406 identifies and analyzes characteristics pertaining to the nature of network traffic between user(s) of client devices and a content provider. Traffic characteristics include traffic from specific geographical locations. Moreover, the granularity of such geographical locations can vary. According to one example embodiment, data describes traffic originating from specific countries, counties, cities, other bounded geographical locations, or some combination thereof. In other embodiments, the granularity of traffic data is finer, relative to tracking a client device over a large geographical area having 3G or 4G wireless network connectivity, by tracking user client devices connected under wireless 5G network environments. Under 5G network environments, where base stations are generally spaced within 100 meters of each other, user population movements can be tracked with finer granularity than 3G or 4G wireless network environments. In addition, TL data indicates a client device's location at particular types of structures or vehicles: commercial, residential, public or private. TL analysis module 406 uses historical connection usage data from such a particular structure of the user or an average of users (e.g., at a coffee shop) and predicts a baseline connection timeout value. In addition to addressing load traffic concerns, one embodiment of TL analysis module 406 anticipates historical security concerns, such as denial of service attack patterns or connections initiated from geographical locations having historically nefarious behavior, and predict a smaller timeout parameter value, relative to geographical locations having historically benign behavior, under such traffic conditions. Once the initial processing of the received data and its comparison to historical data is performed at the analysis module 406, the processed data from one or more of the analysis modules 404-408 is sent to a timeout controller module 410, which is discussed in further detail below.

Service/Content provider (SCP) analysis module 408 identifies and analyzes characteristics pertaining to the nature of the service or content provided by the SCP provider and communicates the content nature characteristic data to timeout controller 410, which predicts, using similar heuristic model processing as discussed above a connection timeout parameter based on the nature of the service/content. In one example, a content provider such as a web server provides static content (e.g., photos, text), streaming content (e.g., audio, video), or some combination thereof.

Timeout controller module 410 receives the analysis data from UB analysis module 404, TL analysis module 406, CSP analysis module 408, or some combination thereof and will analyze the data from each module 404-408 in combination to set a connection timeout value. Timeout controller module 410 applies a predetermined heuristics model to the processed data and further processes the compared data and makes predictions relating to a connection timeout parameter value. In this regard, the heuristics model is machine-learning model that seeks to optimize the timeout parameter in view of the current connection environment and desired timeout outcomes.

From a data bandwidth conservation perspective, according to one embodiment, timeout controller module 410 determines that static content warrants a longer connection timeout parameter, since less data bandwidth is required as compared to streaming content. By comparison, if the content provider is delivering streaming content, such as in the case of a video teleconferencing session in which a plurality of audience participants (i.e., individual users or client devices) are connected, timeout controller module 410 applies a heuristics model that determines that a shorter connection inactivity timeout parameter is warranted to prevent idle audience participants from wasting valuable data bandwidth. According to another embodiment, timeout controller 410 factors data privacy or sensitivity concerns. In this regard, the concern is not on the user's access to such private or sensitive content (e.g., a client user's financial information, medical information, personal identifiable information, or other sensitive information). Instead, the concern is the possibility of other user(s) within the client device's proximity engaging in an over-the-shoulder attack. As a result, timeout controller 410 would also determine that a lower connection timeout value is warranted.

In one example, timeout controller module 410 receives information from TL analysis module 406 that a user and his client device is connected from his residence, as well as information from UB analysis module 404 that the user, client device, or some combination thereof, typically are located at his place of employment on a Monday. UB analysis module 404 also reports that there is a significant shopping sale event on the Monday. CSP module 408 determines that content provider is likely providing merchandise sales content. Timeout controller module 410 analyzes the data from modules 404-408 in combination and determines that it is likely the user is holiday shopping and therefore will require a longer connection timeout value on account of the lengthy shopping options and numerous sale promotions. Such an optimization causes an efficient reduction in resource overhead costs, and reduction in premature disconnections.

In another example relating to security concerns, timeout controller module 410 receives information from TL analysis module 406 that shows a first user connected to a server. TL analysis module 406 also detects other client devices that are not owned or recognized by the first user at the same location or within a proximity of the first user's client device. CSP analysis module 408 processes the received characteristic data that the content provider is providing sensitive content to be displayed on the first user's mobile device. UB analysis module 404 determines from comparison data that the first user has stepped away from his mobile device and has left the mobile device unattended. When factoring all the above information from modules 404-408, timeout controller module 410, applying a predetermined heuristics model to the processed data, further processes the compared data and makes predictions relating to a connection timeout parameter for the first user's client device to a lower timeout value to prevent a potential over-the-shoulder attack by the other users within the same vicinity. According to an embodiment, further security measures set by timeout controller module 410 include a lockout function requiring the first user's authentication (e.g., password challenge, biometric identification challenge) to allow the connection to resume and allow access to the sensitive content.

In another example relating to bandwidth concerns, timeout controller module 410 receives information from TL analysis module 406 that shows a client device travelling at 60 mph on a highway. CSP analysis module 408 determines that content provider is providing streaming video content, such as a motion picture. TL analysis module 406 additionally detects and determines that the user's client device was connected via a 5G wireless connection, but the wireless connection has now been handed over to a 3G (or 4G) wireless connection, having relatively smaller bandwidth and slower data transfer speeds. When factoring all the above information from modules 406-408, timeout controller module 410 via similar heuristic model applications as discussed above, increases the connection timeout parameter to account for the predicted drop in data transfer speeds and the potential for greater network congestion at the slower wireless connection.

Timeout controller module 410 communicates the adjusted (i.e., higher or lower) timeout parameter via I/O interface 402 to gateway server 304, such that gateway server 304 waits the adjusted timeout value for mobile device 302 to respond. The newly adjusted timeout parameter is stored in centralized timeout database 314 for centralized database management. Additionally, or alternatively, the newly adjusted timeout parameter is locally stored in timeout database 306 that locally supports gateway server 304 for local or regional database management.

Figure 5:
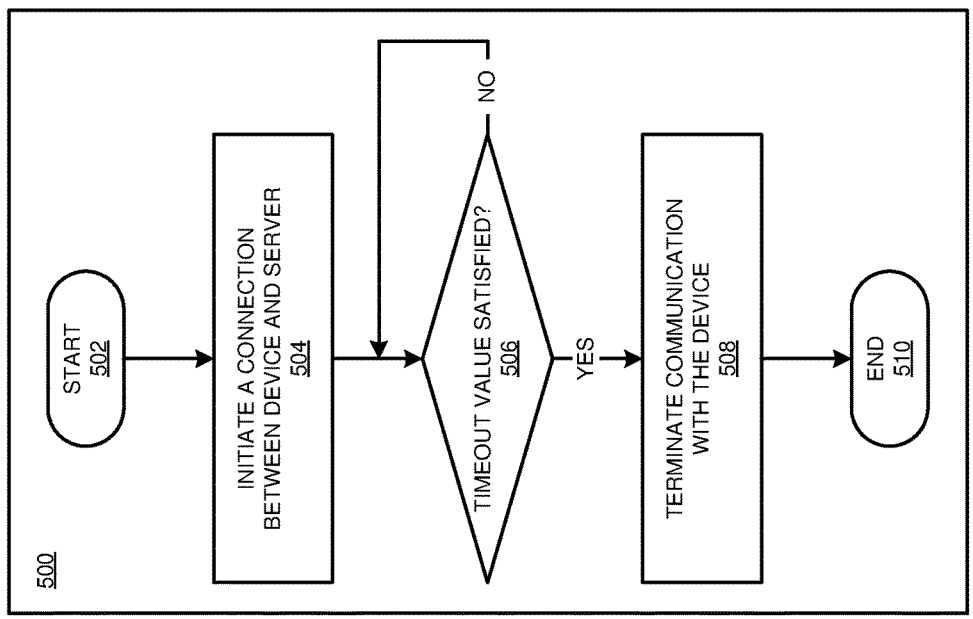
FIG. 5 depicts a flowchart of a process for controlling a connection timeout between a device and a server, in accordance with an illustrative embodiment.

With reference to FIG. 5, this figure depicts a flowchart of an example process 500 for controlling a connection timeout between a device and a server. Process 500 is implemented in server-side application 105*a* or client-side application 105*b-f* of FIG. 1 and some of the components of FIGS. 3 and 4. The process begins at block 502 and proceeds to block 504 where a connection between a mobile device 302 and a content provider 310, such as a web server is initiated. The process proceeds to decision block 506, where gateway server 304 determines whether a period of user inactivity has satisfied a predetermined timeout parameter threshold. If a timeout parameter threshold has not been satisfied, the connection between user device 302 and content provider 310 continues while periodically monitored for satisfaction of a timeout threshold. However, if a timeout parameter threshold has been satisfied, the connection between the user device 302 and the content provider 310 terminates and the process ends at block 510.

With reference to FIG. 6, this figure depicts a flowchart of an example process 600 for dynamically configuring a connection timeout value of a client device with a server. Process 600 is implemented in server-side application 105*a* or client-side application 105*b-f* of FIG. 1 and some of the components of FIGS. 3 and 4. The process begins at block 602 and proceeds to block 604 where DTMS 312 receives and monitors information relating to a characteristic of a content to be rendered by the server, a characteristic of traffic of a connection to the server, and a characteristic of a user of the server. In this regard, the DTMS 312 employs UB analysis module 404, TL analysis module 406, CSP analysis module 408, or some combination thereof, and whose functions have been described in greater detail with reference to FIG. 4 above. The process continues to block 608, where timeout controller module 410 of DTMS 312 automatically adjusts the timeout parameter for an idle device based on one or more categories of the monitored and analyzed information described in relation to block 604. Once the timeout parameter has been determined and set, the process continues to block 610, where the new timeout parameter value replaces the previously stored timeout parameter value stored in centralized timeout database 314, localized timeout database 306, or some combination thereof. The process then ends at block 612.

Thus, a computer implemented method, system or apparatus, and computer program product are provided in the illustrative embodiments for dynamically configuring a connection timeout value of a client device with a server and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving sensor data comprising a characteristic of a content to be rendered for a client device by a server and a characteristic of a first user of the server;
   adjusting automatically using a machine-learning heuristic model, based on the received sensor data, an amount of time in a previously stored timeout parameter associated with the client device to a new timeout parameter to enable communication between the client device and the server;
   storing in a memory the new timeout parameter in place of the previously stored timeout parameter; and
   responsive to the amount of time to wait for a response from the client device satisfying the new timeout parameter, terminating the communication between the client device and the server.

2. The computer-implemented method of claim 1, wherein the sensor data further comprises a characteristic of traffic of a connection to the server.

3. The computer-implemented method of claim 1, further comprising:
   monitoring the characteristic of the content to be rendered by the server and identifying that the characteristic of the content is a streaming content.

4. The computer-implemented method of claim 1, further comprising:
   monitoring the characteristic of the content to be rendered by the server and identifying that the characteristic of the content is a static content.

5. The computer-implemented method of claim 2, wherein the characteristic of traffic is a location of a request to connect to the server.

6. The computer-implemented method of claim 2, wherein the communication between the client device and the server occurs over at least two of a 3G, 4G, or 5G wireless network.

7. The computer-implemented method of claim 2, wherein the adjusting automatically of the amount of time in the previously stored timeout parameter associated with the client device is based on a geographical location of the client device of the first user.

8. The computer-implemented method of claim 7, wherein the adjusting automatically of the amount of time in the previously stored timeout parameter associated with the client device based on the geographical location of the client device of the first user is further based on a geographical location of a second client device that is unknown to the first user.

9. The computer-implemented method of claim 2, further comprising:
identifying in the sensor data that the characteristic of the content to be rendered by the server is sensitive in nature,
wherein the adjusting automatically of the amount of time in the previously stored timeout parameter associated with the client device is responsive to the identifying in the sensor data that the characteristic of the content to be rendered by the server is sensitive in nature.

10. The computer-implemented method of claim 9, further comprising:
identifying a geographical location of the client device of the first user as being within a predetermined threshold proximity to a geographical location of a second client device that is unknown to the first user;
prompting, responsive to the identifying of the geographical location being within the predetermined threshold proximity, an authentication challenge to the first user; and
responsive to authentication of the first user being successful, granting access to the content.

11. The computer-implemented method of claim 1, further comprising:
detecting in the sensor data a changing of a wireless communication network of the communication between the client device and the server from a first wireless communication network to a second wireless communication network,
wherein the adjusting automatically of the amount of time of the previously stored timeout parameter associated with the client device is responsive to the detecting in the sensor data of the changing of the wireless communication network.

12. The computer-implemented method of claim 11, wherein the first wireless communication network has a different connection data transfer speed than the second wireless communication network.

13. The computer-implemented method of claim 2, further comprising:
detecting a change in at least one of the characteristics of the received data and comparing the change to historical data associated with the at least one of the characteristics of the received data,
wherein the adjusting automatically of the amount of time in the previously stored timeout parameter associated with the client device is responsive to the detecting of the change in at least one of the characteristics of the sensor data.

14. The computer-implemented method of claim 2, wherein the characteristic of the first user of the server is at least one of: input device activity, user gaze activity, distance of the first user relative to the client device, age of the first user, and demographics of the first user.

15. The computer-implemented method of claim 14, further comprising:
responsive to historical inactivity periods of the client device, overriding an adjustment of a previously stored timeout parameter associated with the client device.

16. The computer-implemented method of claim 2, wherein the adjusting automatically of the amount of time is based on at least two of the characteristic of the content to be rendered by the server, the characteristic of traffic of the connection to the server, and the characteristic of the first user of the server, in the sensor data.

17. The computer-implemented method of claim 2, wherein the adjusting automatically of the amount of time is based on the characteristic of the content to be rendered by the server, the characteristic of traffic of the connection to the server, and the characteristic of the first user of the server, in the sensor data.

18. A computer usable program product comprising one or more computer-readable storage devices, and program instructions stored on at least one of the one or more storage devices, the stored program instructions comprising:
program instructions to receive sensor data comprising a characteristic of a content to be rendered for a client device by a server and a characteristic of a first user of the server;
program instructions to automatically adjust, using a machine-learning heuristic model, based on the received sensor data, an amount of time in a previously stored timeout parameter associated with the client device to a new timeout parameter to enable communication between the client device and the server;
program instructions to store in a memory the new timeout parameter in place of the previously stored timeout parameter; and
program instructions, responsive to the amount of time to wait for a response from the client device satisfying the new timeout parameter, to terminate the communication between the client device and the server.

19. The computer usable program product of claim 18, the stored program instructions further comprising:
program instructions to determine a change in a characteristic of the content to be rendered by the server and compare the change to historical data associated with the content to be rendered by the server.

20. A computer system for dynamically adjusting a timeout parameter associated with a client device, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive sensor data comprising a characteristic of a content to be rendered for a client device by a server and a characteristic of a first user of the server;
program instructions to automatically adjust, using a machine-learning heuristic model, based on the received sensor data, an amount of time in a previously stored timeout parameter associated with the client device to a new timeout parameter to enable communication between the client device and the server;

program instructions to store in a memory the new timeout parameter in place of the previously stored timeout parameter; and program instructions, responsive to the amount of time to wait for a response from the client device satisfying the new timeout parameter, to terminate the communication between the client device and the server.

* * * * *